UNITED STATES PATENT OFFICE.

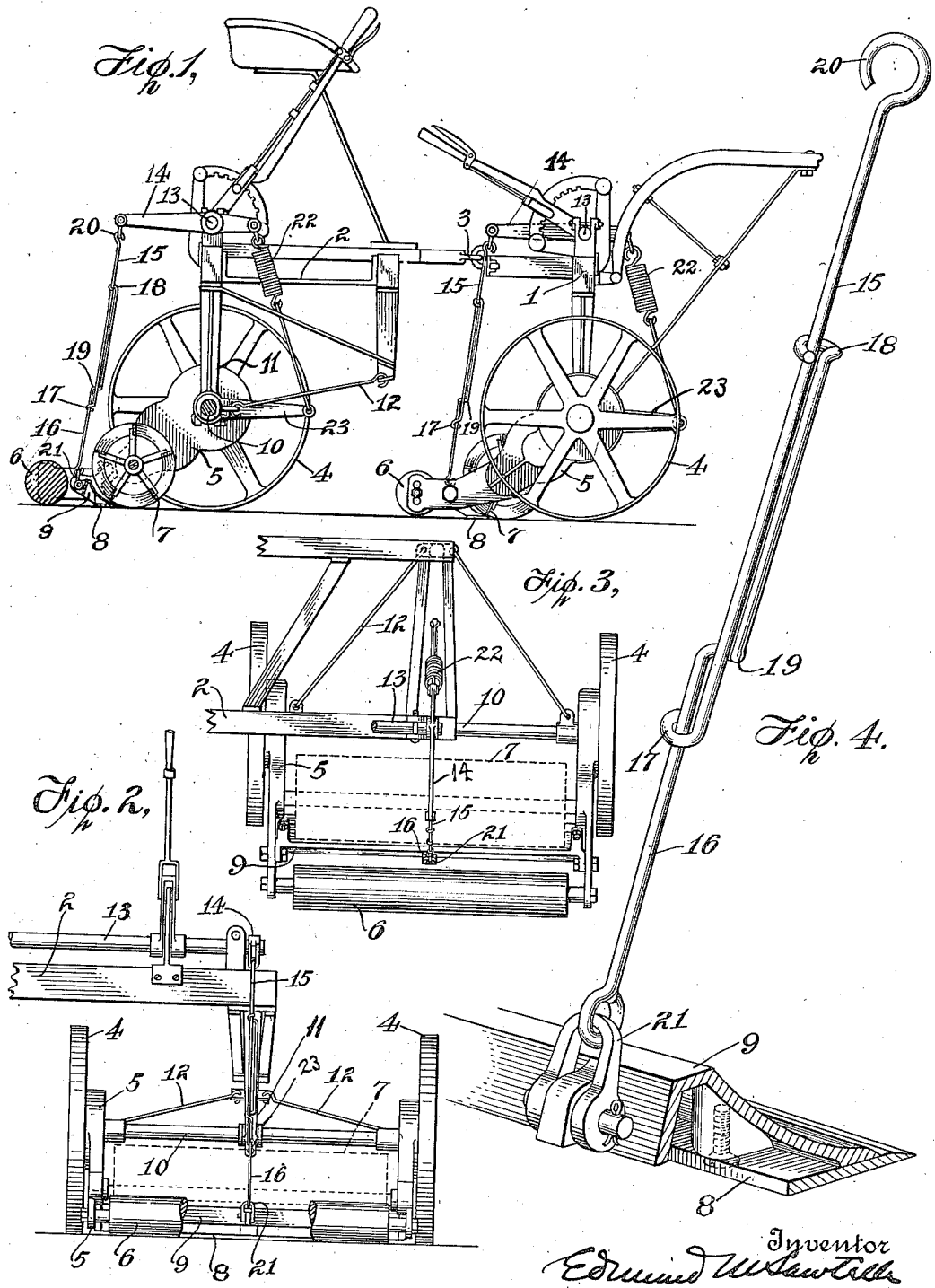

EDMUND M. SAWTELLE, OF ENGLEWOOD, NEW JERSEY, ASSIGNOR TO SHAWNEE MOWER COMPANY, OF SHAWNEE-ON-DELAWARE, PENNSYLVANIA, A CORPORATION OF NEW YORK.

LAWN-MOWER.

1,320,098.  Specification of Letters Patent.  Patented Oct. 28, 1919.

Application filed January 25, 1918. Serial No. 213,636.

*To all whom it may concern:*

Be it known that I, EDMUND M. SAWTELLE, United States citizen, residing in Englewood, New Jersey, have invented the following-described Improvements in Lawn-Mowers.

The invention is an improved and simplified means for lifting and sustaining the cutter mechanism of certain types of lawn mowing apparatus, such for example as shown in Worthington Patent No. 1210879 and among other things hereinbelow disclosed, its object is to avoid the strain and distortion to which the cutter-supporting frames are subjected when used on irregular ground with the wiper rolls elevated. Mowing machines are so used when making a high cut of the grass or when moving about from field to field. At such times and when equipped with the lifting means heretofore used, the rear end of the cutter frame is supported equally on both sides only when the cutter frame is parallel with the main progressing over flat ground. Departure frame, that is to say when the machine is from parallelism such as necessarily occurs from the tilting of the cutter frame in accommodation to irregular ground tends to throw the entire supporting strain to one side or the other and the unsupported side tends to sag thus producing a twisting or skewing distortion in the frame which being subject to constant and frequent reversals leads to early weakening of the frame joints and general deterioration and unless the frame is of unduly heavy construction, keeps the bed knife constantly flexing out of proper cutting relation to the rotary cutter and thereby upsets a close cutting adjustment as the result of uneven wear of the cutting edges. This invention eliminates these objections by attaching the lifting and sustaining means to the cutter frame through an equalizer adapted to divide the lifting or sustaining effort so as to exert equal portions thereof on each side of the frame regardless of the angle of tilt and so that the cutter frame can be made of light construction without incurring the risk of rapid wear or imperfect operation in service. The invention consists broadly in such division or distribution of the strain of supporting the rear or swinging end of the cutter frame and is exemplified in the accompanying drawings in that form in which a part of the cutter frame itself, to wit, the bed knife structure, serves as the equalizing member, this form being perhaps the simplest but by no means the only form in which the principle of the invention may be utilized.

In the drawings—

Figure 1 is a side elevation of a gang lawn mower of the general class referred to;

Fig. 2 a rear elevation of one of the side mowers thereof;

Fig. 3 a top plan of said mower; and

Fig. 4 an enlarged detail of the sustaining means which also constitutes part of this invention.

The machine shown comprises a main frame formed of front and rear sections 1 and 2 united by a flexible joint 3, and supported on a gang of lawn mower units so arranged as to cut overlapping swaths. For the purpose of this description each unit may be assumed to be the same as the others and no different from lawn mowers in common use. Each therefore comprises a pair of ground wheels 4 and a frame 5 which is supported on said wheels at its forward end and on a wiper roll 6 at its rear end with a rotary cutter 7 journaled in the rear part and driven by one or both ground wheels through a driving gear train which is concealed inside of one of the side plates of the frame. The rotary cutter 7 cuts against a bed knife 8 the bed 9 of which forms one of the cross members of the cutter frame being bolted to the side plates thereof. The cross rod 10 which coincides with the axes of the ground wheels and might be regarded as their axle, constitutes a forward cross member for the cutter frame and this member is also in the present case a part upon which the main framework rests upon the lawn mower unit. The said main frame is mounted on the units so that each cutter mechanism in the gang can tilt in a vertical transverse plane, *i. e.*, the plane of the axis of its ground wheel and can also swing in a longitudinal vertical plane, *i. e.*, about the axes of the ground wheels, independently of the tilting and swinging of all of the other units in the gang. Thereby the gang as a whole is adapted to accommodate and mow an undulating lawn surface to an even height of cut. It is quite immaterial to this invention how such accommodation is accomplished. In the structure shown in the drawings, the front unit and its frame section are organized to tilt together in the transverse plane and the rear units support the rear section 2 of the frame through a rocker bearing which the cross rod 10 has upon the crotched end of a frame-post 11. Such bearing is at substantially the vertical center of the cutter frame. The links 12 supported at their forward ends upon the main framework and connected at their rearward ends to the cutter frame near the ground wheels serve to keep the cross rod 10 at all times parallel with itself as it tilts.

The cutter-lifting means for the front and rear units consists of a rock shaft 13 journaled on the main frame and provided with a latch-and-segment hand lever adjacent the operator's seat and also with a lifter lever 14 extending centrally or substantially centrally over each cutter frame. The end of this lifter lever is connected to the bed knife of the cutter frame below it by a telescopic link which is formed of two relatively sliding link sections or rods 15 and 16 as shown in Fig. 4. Each link section is provided with an eye 17 and 18 slidingly embracing the other section whereby they together form a laterally rigid but extensible and contractible connection link. One section is bent or otherwise formed with a shoulder 19 constituting an abutment stop for the eye 17 of the other section and serving to limit the extension motion. One end of the compound link as thus formed is connected by an eye 20 to the lever 14 and the other by a similar eye to the clevis 21 by which it is flexibly attached to the bed knife structure. The point of attachment is at the middle of the bed knife and substantially coincides with the longitudinal axis of the rocker bearing above referred to so that as above stated the lifting strain exerted by the link is divided equally and distortion of the cutter frame thereby prevented for all angles of tilt.

The forward end of the lifter lever is connected through a spring 22 to a forward arm 23 fixed on the cutter frame and this connection is so related to the telescopic link that when the latch lever is pulled to the rear the spring is put under tension and presses the cutter mechanism toward the ground and the compound link collapses or telescopes according to the extent of depression of the lifter arm 14. Forward movement of the latch lever relieves this spring pressure and, when the link reaches the limit of its extension, begins to lift the cutter mechanism and may lift it to variable extent and sustain it with the wiper roll at different elevations above the ground according to the notches in the segment. Although compounded of two sections the lifting link is essentially but a single link and therefore presents very little obstruction to the rearward discharge of the grass cuttings from the rotary cutters, which is desirable as it diminishes the tendency for heavy bunches of grass to collect on the mechanism.

Claims:

1. In lawn mowing apparatus the combination of a main frame and a cutter-supporting frame organized therewith to tilt and swing in transverse and longitudinal, vertical planes respectively, and means for sustaining said cutter frame in an upwardly swung position with its cutter disposed above its lowest cutting position, said means being centrally disposed with reference to said cutter-supporting frame and providing substantially equal support to both sides thereof for all angles of tilt.

2. In the apparatus specified in claim 1 a bed knife structure coacting with the cutter member and provided with a connection to said sustaining means.

3. In apparatus specified in claim 1 the sustaining means consisting of a single lifting link having a central flexible connection direct to the cutter-supporting frame.

4. In apparatus as specified in claim 1 the sustaining means consisting of a single telescopic lifting link centrally connected to the cutter-supporting frame.

5. In a gang lawn mower, cutter elevating and sustaining means comprising two rods each having an eye embracing and sliding upon the other, one of said rods being connected with the frame of a mower unit in rear of the cutter therein and an operator's control member connected to the other rod.

6. An elevating and sustaining means for the cutting mechanism of lawn mowers consisting of an extensible and contractible link comprising link sections sliding one upon the other, one of the sections having a shoulder intermediate of its ends limiting the relative movement of the sections.

7. In a lawn mower, a lifting and sustaining means for the cutter-supporting frame consisting of a compound link composed of two rods, each provided with an eye embracing and slidingly engaging the other and a shoulder formed by bending one of the rods and serving to limit the relative movement of the one upon the other.

In testimony whereof I have signed this specification.

EDMUND M. SAWTELLE.